3,836,602

METHOD OF CYCLOTRIMERIZING 1-BUTEN-3-YNE TO FORM 1,2,4-TRIVINYLBENZENE

Lawson G. Wideman, Akron, Ohio, assignor to The Goodyear Tire & Rubber Company, Akron, Ohio
No Drawing. Filed Nov. 16, 1973, Ser. No. 416,715
Int. Cl. C07c 3/04, 15/10
U.S. Cl. 260—669    4 Claims

ABSTRACT OF THE DISCLOSURE

There is disclosed a method of preparing 1,2,4-trivinylbenzene by cyclotrimerizing 1-buten-3-yne. The catalyst employed in this cyclotrimerization comprises (1) iron salts or iron complexes, (2) an organometallic reducing agent and (3) certain ligands containing nitrogen.

---

This invention relates to a method of preparing 1,2,4-trivinylbenzene. More particularly, it relates to the preparation of 1,2,4 - trivinylbenzene by cyclotrimerizing 1-buten-3-yne.

The trifunctional compound 1,2,4-trivinylbenzene has found utility as a cross-linking agent. This compound is old in the art having been patented in 1960 in U.S. Pat. 2,951,884 to Hoover. Thus, methods for its preparation are known. The present invention provides another novel method for the preparation of 1,2,4-trivinylbenzene which unexpectedly eliminates the production of the undesirable isomeric form of trivinylbenzene, 1,3,5-trivinylbenzene, as does the process described in U.S. Pat. 2,951,884. In that patent, small amounts of the 1,3,5-trivinylbenzene were formed along with the 1,2,4-trivinylbenzene.

Monovinyl acetylene, also known as 1-buten-3-yne, $$CH_2=CH-C\equiv CH$$

is a low cost bifunctional chemical. Therefore, it is advantageous to convert such a material into 1,2,4-trivinylbenzene,

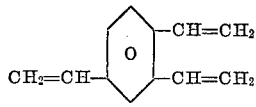

which has excellent cross-linking capabilities, particularly for the cross-linking of unsaturated polymeric materials, such as synthetic and natural rubbers.

The present invention resides in the discovery that in the presence of certain catalyst, 1-buten-3-yne trimerizes to form only 1,2,4-trivinylbenzene. Thus, according to the present invention, 1-buten-3-yne is selectively cyclotrimerized to 1,2,4-trivinylbenzene with a catalyst comprising (1) at least one material selected from the group consisting of iron salts and iron complexes, (2) at least one reducing agent selected from the group consisting of organometallic compounds and metallic hydrides, the metal portions of which are selected from Groups Ia, IIa, IIb and IIIa of the Periodic System of Elements and (3) at least one ligand selected from the group represented by the formulae:

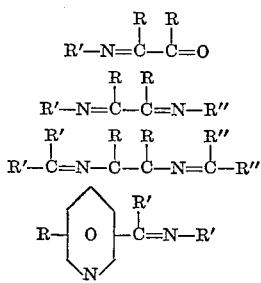

wherein R may be hydrogen, an alkyl group of 1 to 6 carbon atoms or an aryl radical, and R' and R" are hydrocarbons of 4 to 10 carbon atoms and containing double bond unsaturation in conjugation with the C=N unsaturation.

The iron salts useful in the practice of this invention are preferably the iron salts of carboxylic acids containing from about 2 to about 40 carbon atoms. Representative but no means exhaustive of the iron salts of such carboxylic acids include ferric acetate, ferric propionate, ferric isobutyrate, ferric-n-butyrate, ferric trimethyl acetate, ferric-n-pentanoate, ferric 3-methyl butyrate, ferric decanoate, ferric octanoate and ferric benzoate and various other iron salts of other carboxylic acids. Also useful in this invention as an iron salt are the ferric salts of alkyl substituted naphthenic carboxylic acids, and the ferric soaps or the soap called iron drier compounds. The ferric salts of individual naphthenic acids are rarely found because the naphthenic acids are usually complex mixtures with their common derivatives being cyclopentane, cyclohexane, cycloheptane and the higher molecular weight alkyl substituted analogs. The cyclic soaps useful in this invention are usually iron in combination with fatty acids such as stearic rosin (resinates) and tall oil (tallate). Also inorganic iron salts, such as chlorides, bromides, iodides, carbonate, nitrate, sulfate, may be employed.

The iron complexes useful in the invention are the ferric complexes of such agents as 1,3-diketones. Representative of such complexes are ferric 2,4-pentanedionate (commonly called ferric acetylacetonate), ferric-3-methyl-2,4-pentanedionate, ferric-1-ethoxy-1,3 - butanedionate, ferric-1,3-diethoxy-1,3-propanedionate, ferric - 1,3-diphenyl-1,3-propanedionate, ferric-1-cyclohexyl-1,3-butanedionate and other ferric complexes of 1,3-diketones.

Of all the compounds useful as the ferric salt or ferric complex in this invention, the ferric carboxylic acid salts, such as ferric decanoate, ferric octanoate and also ferric acetylacetonate are preferred.

The second component of the catalyst system are reducing agents consisting of at least one member of the class of metal compounds selected from the group consisting of organometallic compounds and hydrides of elements of Groups Ia, IIa, IIb and IIIa of the Periodic System of Elements. The preferred metallic elements from the above groups are lithium, sodium, potassium, magnesium, calcium, boron and aluminum. Representative but not all inclusive of suitable compounds of the above metallic elements are lithium hydride, calcium hydride, aluminum hydride, phenyl sodium, phenyl lithium, n-butyl lithium, tertiary butyl lithium, benzyl potassium, phenyl magnesium chloride, ethyl magnesium bromide, diethyl magnesium, triethyl aluminum, triisobutyl aluminum, dibutyl zinc, diethyl zinc and the like. Trialkylaluminums such as triethylaluminum is the preferred organometallic compound for use with this invention.

The third component of the ternary catalyst system of this invention consists of an organic ligand type molecule. The ligand is believed to direct the reaction toward the cyclotrimer formation wherein the cyclotrimer contains only the 1,2,4 isomer. One class of ligands which is employed in the present invention are those ligands responding to the formula:

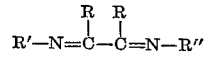

wherein R may be hydrogen, an alkyl radical of 1 to 6 carbons or an aryl radical; and R' and R" are hydrocarbons of 4 to 10 carbons containing double bond unsaturation in conjugation with the C=N unsaturation. These ligands may be described as imines. Representative examples of such ligands are: biacetyl-bis-(2,4,6-trimethylanil), biacetyl - bis - (2 - trifluoromethylanil), biacetyl-bis-anil, biacetyl-bis-(4-hydroxyanil), biacetyl-bis-(2-methylthioanil), glyoxal-bis-(2,4,6-trimethylanil), glyoxal-bis-(2-methoxyanil), glyoxal-bis-(2,6-dimethylanil), biacetyl-bis-(2,5-dimethoxyanil), biacetyl-bis-4-ethoxyanil), biacetyl-bis - (2 - ethoxyanil), biacetyl-bis-(2-methylanil), biaceyl-bis-(3-methylanil), biacetyl-bis-(4-methylanil), glyoxal-bis-(4-methylanil), biacetyl-bis-(2,3-dimethylanil), biacetyl-bis-(2,4-dimethylanil), biacetyl-bis-(2,5-dimethylanil), biacetyl-bis-(2,6-dimethylanil), biacetyl-bis-(3,4-dimethylanil), biacetyl-bis-(3,5-dimethylanil), biacetyl-bis-(4-ethylanil), biacetyl-bis-(4-diethylaminoanil), biacetyl-bis-(2-isopropylanil), glyoxal-bis-(2-isopropylanil), and biacetyl-bis-(4-tert. butyl anil).

Of these ligands, those ligands which are preferred are the ligands in which R' and R'' in the above mentioned formula represent benzene type substituents and of these the most preferred are those which contain substitution at the 2 and/or 6 position of the benzene ring.

Another class of ligands which may be employed are those responding to the formula:

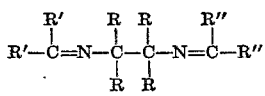

wherein R and R' each represent hydrogen and an alkyl radical of 1 to 6 carbon atoms or an aryl radical or a hydrocarbon radical of 4 to 10 carbon atoms containing double bond unsaturation in conjugation with the C=N unsaturation and at least one R' and at least one R'' is a hydrocarbon radical containing double bond unsaturation in conjugation with the C=N unsaturation and R is hydrogen and alkyl radicals of 1–10 carbon atoms or a phenyl radical. Representative examples of such ligands are: N,N' - bis - (benzal)-ethylenediamine; N,N'-bis(benzal) - 1,2 - dimethylethylenediamine; N,N'-bis(2-methylbenzal) - ethylenediamine; N,N'-bis(3-methylbenzal)-ethylenediamine; N,N'-bis(4-methylbenzal)-ethylenediamine; N,N' - bis - (4-diethylaminobenzal)-ethylenediamine; and other similar ligands.

Also those ligands may be employed which respond to the formula:

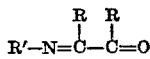

wherein R' and R are defined as previously indicated. Representative of such ligands are: biacetyl-(4-diethylaminoanil); glyoxal-(4-diethylaminoanil); biacetyl-(4-methylanil); glyoxal-(2-methylanil); glyoxal-(2,3-dimethylanil); glyoxal - (2,6-dimethylanil); biacetyl - (2,6-dimethylanil and other similar ligands.

Also, those ligands responding to the formula:

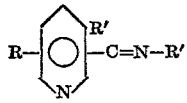

wherein R and R' are defined as previously indicated. Representative of such ligands are: 2-acetylpyridine-anil; 6-methyl-2-acetylpyridine-anil; 2-acetylpyridine-2-methylanil; 2-formylpyridine-anil; 6-methyl-2-formylpyridine-anil; 2 - formylpyridine - 3-methylanil; 2-acetylpyridine-2,6-dimethylanil; 2-acetylpyridine-2-chloroanil.

Of all the ligands useful in this invention, it is preferred to use the ligands represented by the formula

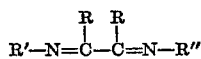

representative of which are glyoxal-bis-(2,6-dimethylanil) and glyoxal-bis-(2,4,6-dimethylanil).

The process of this invention is straightforward and requires no special techniques. It has been determined that the ligand to iron mole ratio of the catalyst system may vary over a wide range. Although there is no definite lower limit of ligand to use, sufficient ligand must be employed to assure a high selectivity to the 1,2,4-trivinylbenzene species. Likewise, there is no theoretical upper limit to the ligand/Fe$^{+++}$ mole ratio, but a large excess would be wasteful. It has been found that the ligand/Fe$^{+++}$ mole ratio between about 1/1 and 4/1 gives satisfactory results and a more preferred ratio is 1.5/1 to 3/1.

The mole ratio of the reducing agent to the iron may vary widely. While no absolute limits have been determined, it is noted that if the reducing agent is a monovalent metal compound, such as, for instance, alkyl lithium, the mole ratio of the reducing agent to the iron may vary between about 1/1 to about 60/1. A more preferred range would be 1/1 to 20/1 with most preferred range being 2/1 to 10/1. Another reducing agent is a multivalent organometallic, such as an alkyl aluminum compound, the mole ratio of the reducing agent/iron has been found to vary from about 1/1 to about 40/1. A more preferred range would be 1/1 to 20/1 with most preferred being 1/1 to 10/1.

The conditions required to cyclotrimerize 1-buten-3-yne to 1,2,4-trivinylbenzene are not critical and may vary widely. For instance, a broad range of temperatures may be employed from about −20 to 130° C. However, it is more preferable to use elevated temperatures of about 80 to about 100° C. The pressure employed in the reaction may vary from ambient pressures to several hundred p.s.i.g. It is preferable to employ anhydrous and oxygen-free conditions as both water and oxygen have a deleterious effect on the catalyst system employed.

Although a solvent system is not necessary, it is desirable to employ inert solvents, such as benzene and toluene, particularly as an aid in controlling the temperature of the reaction. If a solvent is employed, there is no critical amounts needed, but one may adjust the solvent/1-butene-3-yne ratio to give the best temperature control.

The amount of catalyst employed is not very critical although one must employ sufficient catalyst to cause the trimerization reaction to take place. For instance, the mole ratio of the vinyl acetylene to iron may vary from less than 100 to over 1,000 with a mole ratio of about 300 to about 600 being more preferred.

The invention is further exemplified by reference to the following examples which are set forth to illustrate the invention and are not to be interpreted as being in any way limiting to the invention.

EXAMPLE I

A heat-dried 1-liter stainless steel reactor was sparged with nitrogen and charged with 0.0006 mole of ferric octanoate, 0.0012 mole of glyoxal-bis-(2,6-dimethylanil) and 0.510 mole of vinyl-acetylene (2.04 molar in sodium-dried toluene.) The reactor contents were stirred continuously and heated to 90° C. before 0.0024 mole of triethylaluminum in 10 milliliters of benzene was added with pressurized nitrogen gas. The reaction was allowed to proceed for 15 minutes before cooling and quenching with 5 milliliters of water. The reaction mixture was analyzed by gas chromatographic analysis and separated by liquid chromatography over deactivated alumina and eluted with pentane. The results were a 48 percent conversion of vinylacetylene and a 83.3 percent selectivity to 1,2,4-trivinyl-benzene as confirmed by mass spectrometer and nuclear magnetic resonance analysis. No 1,3,5-trivinylbenzene was detected and the remaining selectivity was to a polymeric material.

EXAMPLE II

The reaction was carried out under the conditions of Example I, except that the temperature was maintained at 100° C. The conversion of vinylacetylene was 68.0 percent and the selectivity to trivinylbenzene (1,2,4-) was 60.5 percent with the remainder of the product being polymeric material.

EXAMPLE III

A heat-dried 100 milliliter glass reactor was charged with 0.0005 mole of ferric octanoate, 0.0012 mole of glyoxal-bis-(2,6-dimethylanil), and 26 milliliters of 1.90 molar vinylacetylene in sodium-dried toluene under a nitrogen atmosphere. The temperature of the reactor was maintained at 25° C. and 0.0012 mole of triethylaluminum in benzene was added and the reactor was agitated for 60 minutes. Gas chromatographic analysis of reaction mixture revealed a 10.0 percent conversion of vinylacetylene and a 85.0 percent selectivity to 1,2,4-trivinylbenzene.

EXAMPLE IV

The conditions employed in Example III were used except that the temperature was maintained at −20° C. The conversion of vinylacetylene was 7.5 percent and the selectivity to 1,2,4-trivinylbenzene was 90.0 percent.

As can be noted from the examples set forth above, the practice of the present invention provides for the cyclotrimerization of 1-buten-3-yne to form 1,2,4-trivinyl benzene without the formation of other isomeric products. Also the practice of this invention provides a process whereby higher and more practical temperatures can be employed with shorter reaction times than those of the prior art. It might be noted that in U.S.P. 2,951,884, small amounts of 1,3,5-trivinylbenzene were formed along with the 1,2,4-trivinyl benzene. In that patent, the patentees state that the 1,3,5-isomer is not desired because it does not perform in the manner as does the 1,2,4-isomer. Furthermore, in that patent, the preparations were conducted at temperatures from about −10° up to 52° C. Furthermore, the patentees in that reference state that 1,2,4-trivinylbenzene shows unexpectedly different results from those possessed by 1,3,5-trivinylbenzene. Thus, the process of this application shows unexpected improvements over the prior art process.

While certain representative embodiments and details have been shown for the purpose of illustrating the invention, it will be apparent to those skilled in this art that various changes and modifications may be made therein without departing from the spirit or scope of the invention.

What is claimed is:

1. The method which comprises preparing 1,2,4-trivinylbenzene by cyclotrimerizing 1-buten-3-yne with a catalyst comprising (1) at least one material selected from the group consisting of iron salts and iron complexes, (2) at least one reducing agent selected from the group consisting of organometallic compounds and metallic hydrides, the metal portions of which are selected from Groups Ia, IIa, IIb and IIIa of the Periodic System of Elements and (3) at least one ligand selected from the group represented by the formulae:

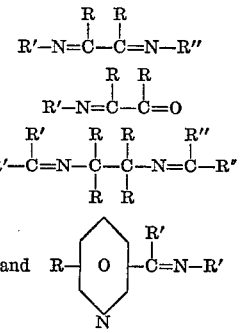

wherein R may be hydrogen, an alkyl group of 1 to 6 carbon atoms or an aryl radical, and R' and R" are hydrocarbons of 4 to 10 carbon atoms and containing double bond unsaturation in conjugation with the C=N unsaturation, and wherein N is nitrogen and O is oxygen.

2. The method according to claim 1 in which (1) is an iron salt of a carboxylic acid, (2) is aluminum trialkyl and (3) is a ligand of the formula:

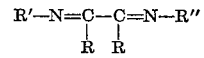

wherein R is a hydrogen, an alkyl group of 1 to 6 carbon atoms or an aryl radical; R' and R" are hydrocarbons of from 4 to 10 carbon atoms and containing double bond unsaturation in conjugation with the C=N unsaturation.

3. The method according to claim 1 in which the ligand/Fe$^{+++}$ mole ratio ranges between about 1/1 and about 4/1 and the mole ratio of the reducing agent/iron ranges between about 1/1 and about 60/1.

4. The method according to claim 2 in which the ligand is selected from the group of glyoxal-bis-(2,6-dimethylanil) and glyoxal-bis(2,4,6-trimethylanil).

References Cited
UNITED STATES PATENTS

| 3,126,424 | 3/1964 | Mueller et al. | 260—673 |
| 3,131,155 | 4/1964 | Luttinger et al. | 260—673 |
| 3,277,198 | 10/1966 | Holm et al. | 260—673 |

CURTIS R. DAVIS, Primary Examiner

U.S. Cl. X.R.
260—668 R, 673